United States Patent
Smith et al.

(10) Patent No.: US 11,082,521 B2
(45) Date of Patent: Aug. 3, 2021

(54) SINGLE SOURCE OF INFORMATION APPARATUSES, METHODS, AND SYSTEMS

(71) Applicant: California Eastern Laboratories, Inc., Santa Clara, CA (US)

(72) Inventors: Matthew Todd Smith, Erie, CO (US); James Paul Hartman, Canton, GA (US); Damon Mark Stewart, Longmont, CO (US)

(73) Assignee: California Eastern Laboratories, Inc., Santa Clara, CA (US)

( * ) Notice: Subject to any disclaimer, the term of this patent is extended or adjusted under 35 U.S.C. 154(b) by 55 days.

(21) Appl. No.: 16/422,203

(22) Filed: May 24, 2019

(65) Prior Publication Data

US 2020/0374357 A1 Nov. 26, 2020

(51) Int. Cl.
| | |
|---|---|
| *G06F 15/16* | (2006.01) |
| *H04L 29/08* | (2006.01) |
| *H04L 12/66* | (2006.01) |
| *H04W 4/80* | (2018.01) |
| *H04L 12/26* | (2006.01) |
| *H04W 84/18* | (2009.01) |

(52) U.S. Cl.
CPC ............ *H04L 67/288* (2013.01); *H04L 12/66* (2013.01); *H04L 43/10* (2013.01); *H04L 67/1097* (2013.01); *H04W 4/80* (2018.02); *H04W 84/18* (2013.01)

(58) Field of Classification Search
CPC ... H04L 67/288; H04L 67/1097; H04L 12/66; H04L 43/10; H04W 4/80; H04W 84/18
USPC .................................................. 709/201, 203
See application file for complete search history.

(56) References Cited

U.S. PATENT DOCUMENTS

| | | | |
|---|---|---|---|
| 9,756,117 B2* | 9/2017 | Corrao | G06F 16/95 |
| 9,806,943 B2* | 10/2017 | Golshan | H04L 67/34 |
| 10,027,761 B2* | 7/2018 | Jalan | H04L 63/1458 |
| 10,038,693 B2* | 7/2018 | Jalan | H04L 63/1466 |
| 10,531,545 B2* | 1/2020 | Barna | H05B 47/105 |
| 2012/0180135 A1* | 7/2012 | Hodges | H04L 67/306 |
| | | | 726/26 |
| 2012/0271903 A1* | 10/2012 | Luna | G06F 9/5016 |
| | | | 709/213 |
| 2012/0311062 A1* | 12/2012 | Frydman | G06F 15/17331 |
| | | | 709/212 |
| 2013/0110961 A1* | 5/2013 | Jadhav | H04L 67/2842 |
| | | | 709/213 |
| 2014/0207280 A1* | 7/2014 | Duffley | A47L 9/2857 |
| | | | 700/257 |
| 2014/0207282 A1* | 7/2014 | Angle | G05B 15/02 |
| | | | 700/257 |

(Continued)

*Primary Examiner* — Thu Ha T Nguyen
(74) *Attorney, Agent, or Firm* — Richard W. James

(57) ABSTRACT

A control network communication apparatus, method, and system. The method of communicating control network information to a user interface includes a wireless gateway receiving control system information from a control node wirelessly over a local area mesh network, the wireless gateway receiving a request for control system information when it polls a remote server over a wide area network, the request transmitted to the remote server from a user interface, and the wireless gateway providing the requested control system information to the remote server for delivery to the user interface.

20 Claims, 4 Drawing Sheets

(56) References Cited

U.S. PATENT DOCUMENTS

| | | | | |
|---|---|---|---|---|
| 2014/0330955 A1* | 11/2014 | Bishop | H04L 41/069 | |
| | | | 709/224 | |
| 2015/0297776 A1* | 10/2015 | Conroy | G08B 23/00 | |
| | | | 239/11 | |
| 2016/0072889 A1* | 3/2016 | Jung | H04L 67/1097 | |
| | | | 709/219 | |
| 2017/0005515 A1* | 1/2017 | Sanders | H02J 3/32 | |
| 2017/0027043 A1* | 1/2017 | Greene | H04W 40/22 | |
| 2017/0093942 A1* | 3/2017 | Danielsson | H04N 21/25808 | |
| 2017/0094376 A1* | 3/2017 | Trainor | H04Q 9/00 | |
| 2017/0168812 A1* | 6/2017 | Golay | G06F 8/654 | |
| 2017/0207956 A1* | 7/2017 | Cabral | H04L 41/082 | |
| 2017/0270757 A1* | 9/2017 | Trani | G08B 25/08 | |
| 2017/0289650 A1* | 10/2017 | Schattmaier | G08B 31/00 | |
| 2017/0352102 A1* | 12/2017 | Vavrasek | G06N 7/005 | |
| 2018/0036448 A1* | 2/2018 | Becker | A61L 9/037 | |
| 2018/0100663 A1* | 4/2018 | Crimins | F24F 11/62 | |
| 2018/0188704 A1* | 7/2018 | Cella | G05B 19/4183 | |
| 2018/0196972 A1* | 7/2018 | Lu | G06K 19/0716 | |
| 2018/0284747 A1* | 10/2018 | Cella | G05B 23/0264 | |
| 2018/0306609 A1* | 10/2018 | Agarwal | H04W 4/38 | |
| 2018/0309651 A1* | 10/2018 | Kim | H04L 43/0823 | |
| 2018/0332434 A1* | 11/2018 | Kulkarni | H04W 4/35 | |
| 2019/0043207 A1* | 2/2019 | Carranza | G06K 9/00771 | |
| 2019/0047493 A1* | 2/2019 | Chierichetti | B60R 16/0234 | |
| 2019/0056132 A1* | 2/2019 | Warren | F24F 11/30 | |
| 2019/0097835 A1* | 3/2019 | Bhat | G06F 8/60 | |
| 2019/0158975 A1* | 5/2019 | Petersen | H04W 4/70 | |
| 2019/0174449 A1* | 6/2019 | Shan | H04W 60/00 | |
| 2019/0174466 A1* | 6/2019 | Zhang | H04L 5/0048 | |
| 2019/0222652 A1* | 7/2019 | Graefe | H04W 84/18 | |
| 2019/0349426 A1* | 11/2019 | Smith | H04L 67/104 | |
| 2020/0133255 A1* | 4/2020 | Cella | G05B 19/41875 | |
| 2020/0170024 A1* | 5/2020 | Agerstam | H04W 72/121 | |
| 2020/0226031 A1* | 7/2020 | Lau | G06F 11/1464 | |
| 2020/0244297 A1* | 7/2020 | Zalewski | H02N 11/002 | |
| 2020/0348662 A1* | 11/2020 | Cella | G05B 23/024 | |
| 2020/0357276 A1* | 11/2020 | Yang | G06K 9/4604 | |
| 2021/0007023 A1* | 1/2021 | Umapathy | H04W 36/00837 | |
| 2021/0084536 A1* | 3/2021 | Chou | H04W 36/22 | |
| 2021/0120524 A1* | 4/2021 | Palle | H04W 76/28 | |

* cited by examiner

SINGLE SOURCE OF INFORMATION APPARATUSES, METHODS, AND SYSTEMS

BACKGROUND

Field of the Disclosure

The present disclosure generally relates to communication of a wireless device to a network controller on a local area network (LAN) or a wide area network (WAN) and, more particularly, to a user interface communicating locally or remotely with a gateway in a building control system.

Brief Description of Related Art

Computer automated control systems may be accessed by a device, such as a wireless user interface. That wireless user interface may retrieve information from the computer automated control system and may transmit information to the computer automated control system. For example, the user interface may receive the status of a device on the computer automated control system, receive a current sensed condition from the computer automated control system, and provide schedule and configuration information to the computer automated control system.

The wireless user interface may communicate with devices on the computer automated control system, may communicate with a cloud server that periodically retrieves information from the computer automated control system, or both. Such a system too frequently provides information that is not accurate to the user interface because, for example, the cloud information is outdated and too frequently does not provide user interface changes to the computer automated control system promptly. Such a system also requires significant bandwidth for regular communication between a device such as a gateway on the computer automated control system and the cloud.

Accordingly, there is a need for systems, apparatuses, and methods in which a device in the computer automated control system is the sole source of information transferred to or from the computer automated control system.

SUMMARY OF THE INVENTION

In one embodiment, the present disclosure contemplates a control network that includes a gateway, a control node, a cloud server. The control node communicates control information to the gateway on a local area network and the user interface communicates with the gateway by way of a wide area network, the user interface communicating with the gateway by sending messages to the cloud server that are retrieved from the cloud server by the gateway through gateway polling of the cloud. The user interface only receives information from the cloud that was left for the user interface on the cloud by the gateway in response to a user interface request for information.

In another embodiment, the present disclosure contemplates a method of communicating control network information to a user interface wherein a wireless gateway receives control system information from a control node wirelessly over a local area mesh network, the wireless gateway receives a request for control system information when it polls a remote server over a wide area network, the request being transmitted to the remote server from a user interface, and the wireless gateway providing the requested control system information to the remote server for delivery to the user interface. In embodiments, the user interface never retrieves any information from the remote server that was not left at the remote server by the gateway for the user interface and the user interface never receives information from the remote server that was not provided to the remote server by the gateway in response to a user interface request, making the gateway the sole source of information to the user interface.

In yet another embodiment, the present disclosure contemplates a gateway single source of information system. That system includes a local area network, a server that is remote from the local area network, and a user interface device. The local area network includes an actuating node, a powered device connected to and actuated by the actuating device, and a gateway wirelessly coupled to the actuating node on the local area network, the gateway storing data regarding the operation of the actuating device. The remote server includes a database storing a periodically backed up copy of the data stored on the gateway and a user interface device for communicating with the gateway. The gateway includes a processor and a computer readable storage medium, the computer readable storage medium storing code executable by the processor. When executed by the processor, the code executable by the processor causes the processor to receive and store from the actuating device an update to the data regarding a change in operation of the powered device connected to the actuating device, receive and store from the user interface device another update to the data regarding another change in operation of the powered device, and receive a prompt for information regarding the powered device from the user interface device. When the user interface device is communicating on the local area network, the gateway will wirelessly transmit to the user interface via the local area network a subset of the current data stored on the gateway regarding current operation of the powered device and when the user interface device is not communicating on the local area network, the gateway will transmit from only the gateway to the user interface via the remote network a subset of the current data stored on the gateway regarding current operation of the powered device.

BRIEF DESCRIPTION OF THE DRAWINGS

For the present disclosure to be easily understood and readily practiced, the present disclosure will now be described for purposes of illustration and not limitation, in connection with the following figures.

The accompanying drawings, wherein like reference numerals are employed to designate like components, are included to provide a further understanding of the present inventions, are incorporated in and constitute a part of this specification, and show embodiments of those apparatuses and methods that together with the description serve to explain those apparatuses and methods.

Figure 1:
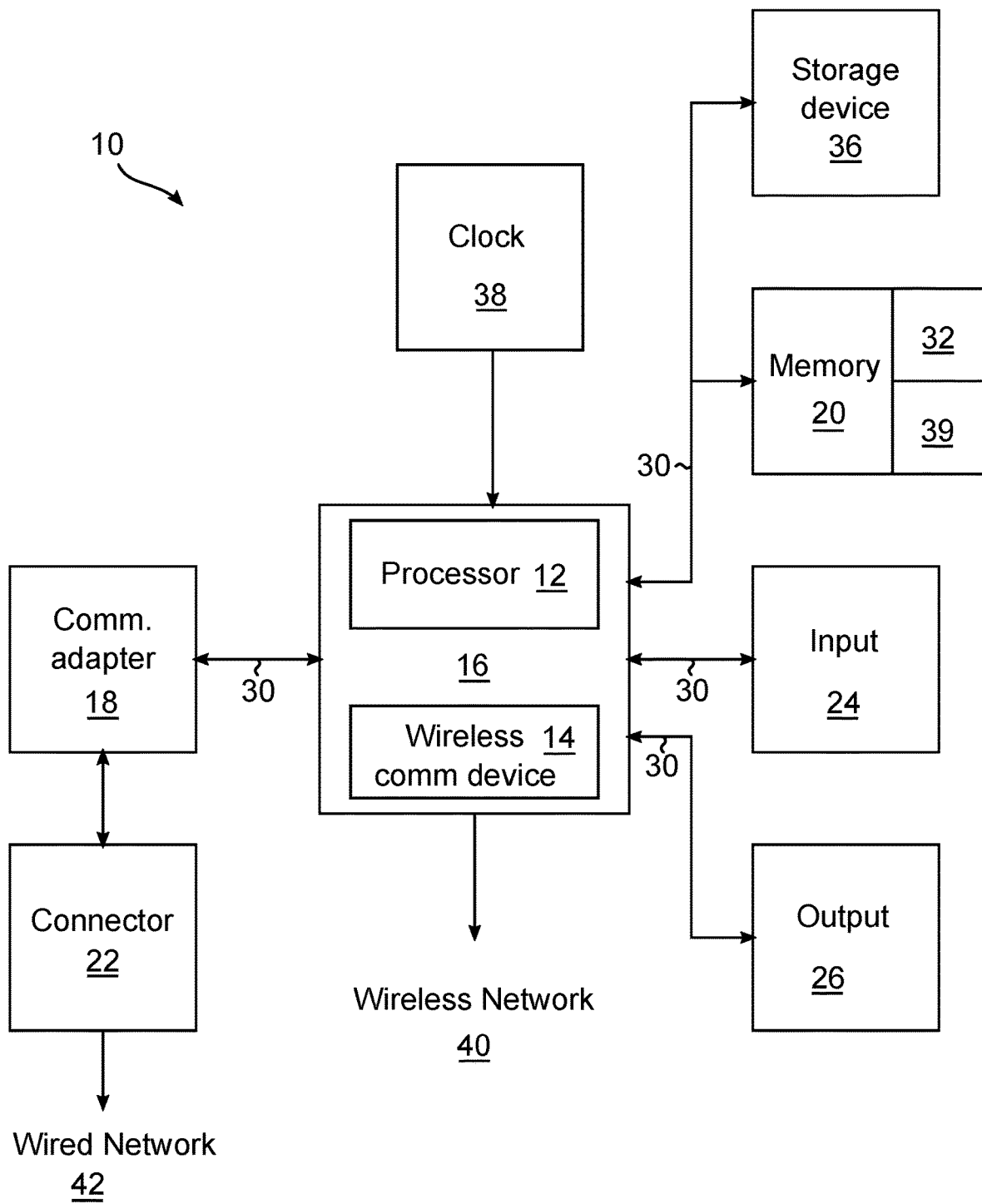
Figure 2:
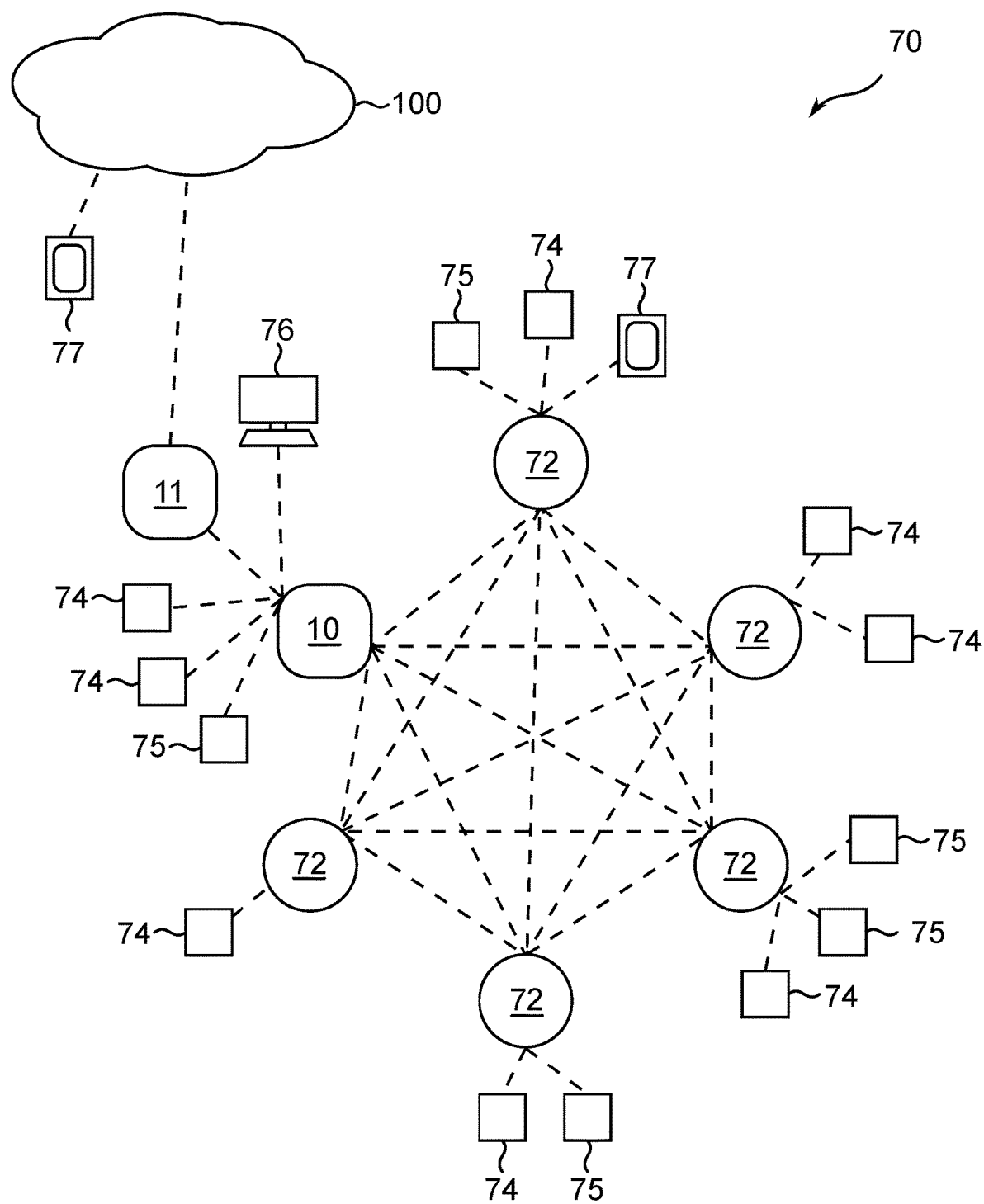
Figure 3:
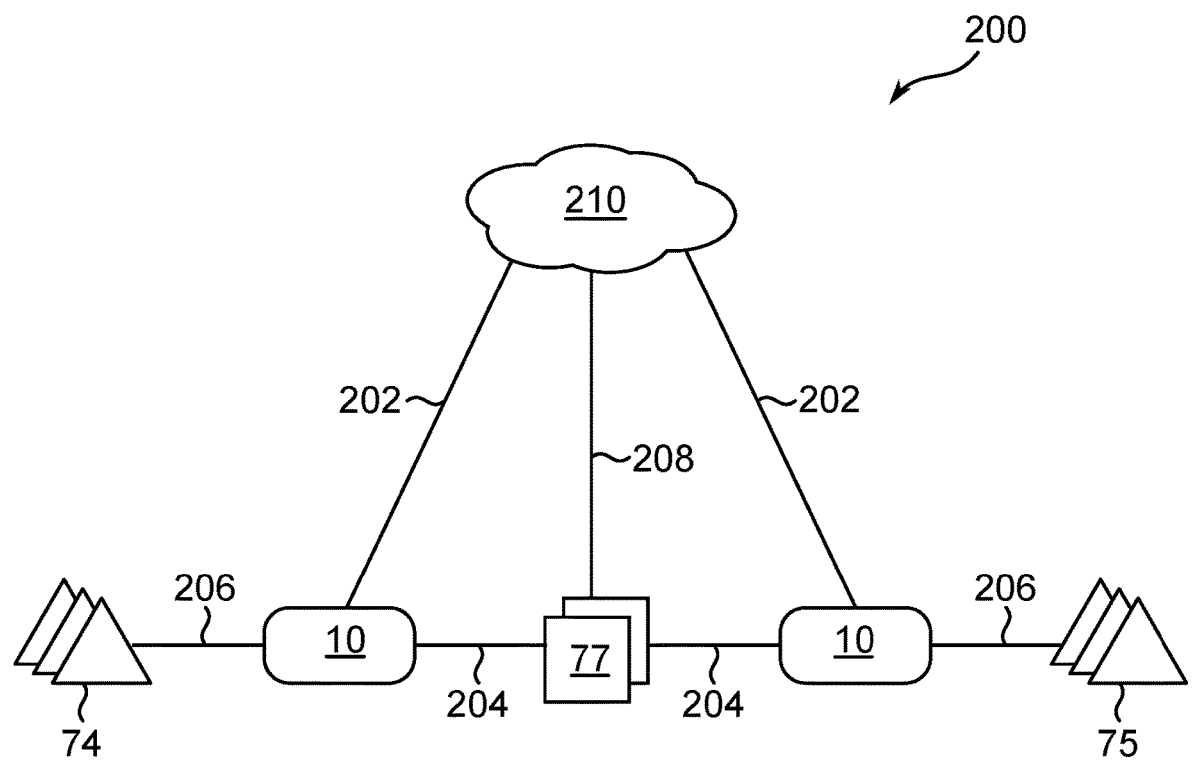
Figure 4:
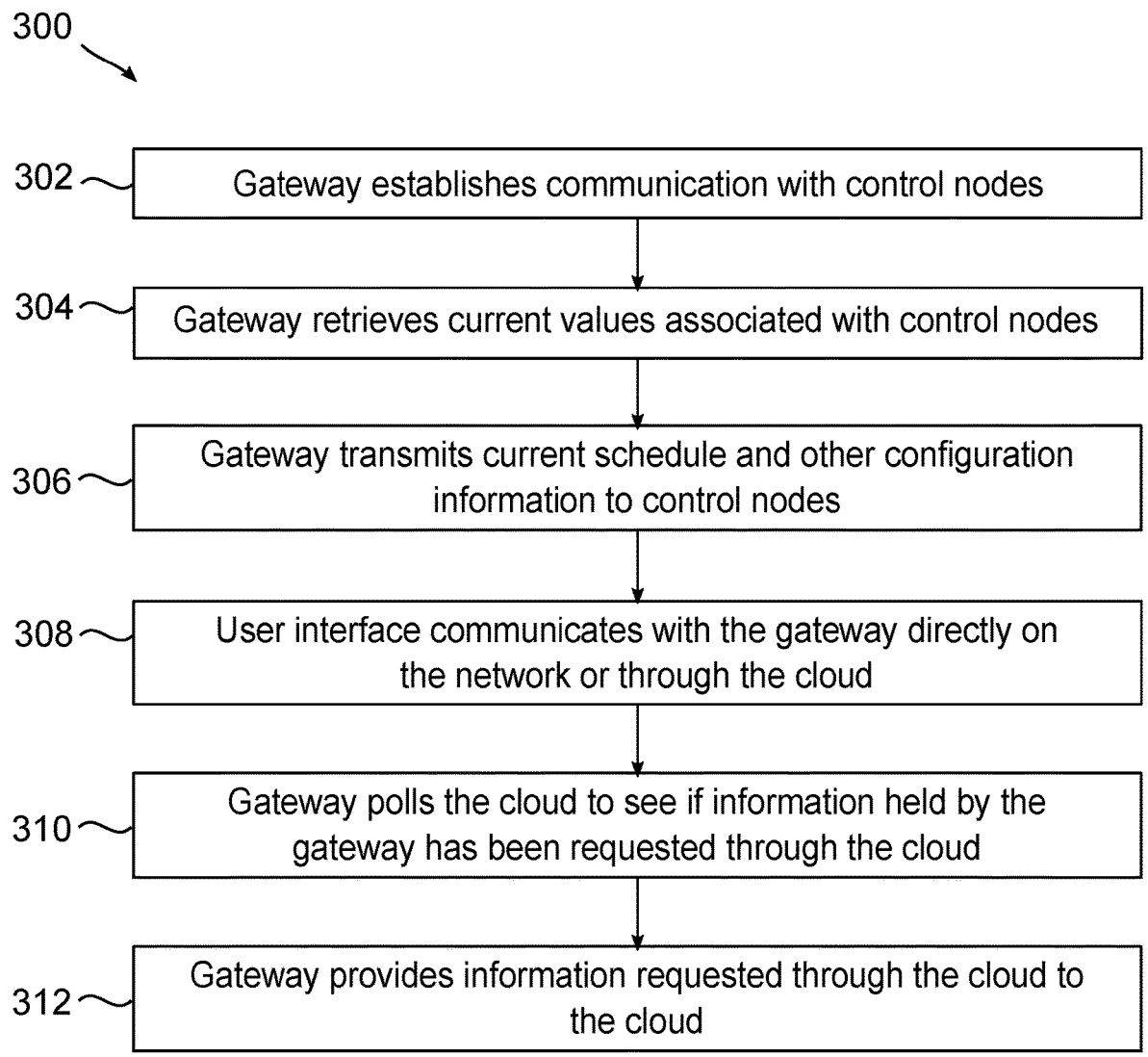

Various other objects, features and advantages of the invention will be readily apparent according to the following description exemplified by the drawings, which are shown by way of example only, wherein:

FIG. 1 illustrates an embodiment of a gateway that operates in connection with control and communication on a local area network;

FIG. 2 illustrates an embodiment of a network in which embodiments of the present invention may operate;

FIG. 3 illustrates communication paths in an embodiment of the present invention; and FIG. 4 illustrates an embodiment of a method of communication between a user interface and a gateway.

DETAILED DESCRIPTION OF THE INVENTION

Reference will now be made in detail to certain embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in typical radios.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term FIG. 1 illustrates an embodiment of a gateway 10 with which a user interface is to communicate in embodiments of transient network communication. The gateway 10 includes a processor 12 and a wireless network communication device 14, which may be a ZigBee® network communication device. The processor 12 and wireless communication device 14 may be combined in a controller 16, which may be a microcontroller. The gateway 10 may also include a communication adaptor 18, memory 20, a communication adaptor port or connector 22, one or more input devices 24, diagnostic output devices 26, and a clock 38.

The gateway 10 may furthermore facilitate communications across networks including one or more wireless networks 40 and one or more wired networks 42.

It should be recognized that the gateway 10 may have fewer components or more components than shown in FIG. 1. For example, if an input device 24 or output device 26 is not desired, such a device may not be included in the gateway 10.

The elements, including the processor 12, memory 20, data storage device 36, output 26, input 24, and communication adaptor 18 related to the gateway 10 may communicate by way of one or more communication busses 30. Those busses 30 may include, for example, a system bus or a peripheral component interface bus.

The memory 20 may, for example, include random-access memory (RAM), flash RAM, dynamic RAM, or read only memory (ROM) (e.g., programmable ROM, erasable programmable ROM, or electronically erasable programmable ROM) and may store computer program instructions and information. The memory 20 may furthermore be partitioned into sections including an operating system partition 32 where system operating instructions are stored, and a data partition 39 in which data is stored.

The processor 12 may be any desired processor and may be a part of a controller 16, such as a microcontroller, may be part of or incorporated into another device, or may be a separate device. The processor 12 may, for example, be an Intel® manufactured processor or another processor manufactured by, for example, AMD®, DEC®, or Oracle®. The processor 12 may furthermore execute the program instructions and process the data stored in the memory 20. In one embodiment, the instructions are stored in the memory 20 in a compressed or encrypted format. As used herein the phrase, "executed by a processor" is intended to encompass instructions stored in a compressed or encrypted format, as well as instructions that may be compiled or installed by an installer before being executed by the processor 12.

The data storage device 36 may, for example, be non-volatile battery backed static random-access memory (RAM), a magnetic disk (e.g., hard drive), optical disk (e.g., CD-ROM) or any other device or signal that can store digital information. The data storage device 36 may furthermore have an associated real-time clock 38, which may be associated with the data storage device 36 directly or through the processor 12 or controller 16. The real-time clock 38 may trigger data from the data storage device 36 to be sent to the processor 12, for example, when the processor 12 polls the data storage device 36. Data from the data storage device 36 that is to be sent across the network 40 or 42 through the processor 12 may be sent in the form of messages in packets. Those messages may furthermore be queued in or by the processor 12. The data storage device 36 may not be necessary for operation of the gateway 10 in certain embodiments as data may be stored in memory, for example. Data may also be stored remotely and accessed over a network, such as the Internet.

The communication adaptor 18 permits communication between the gateway 10 and other gateways 11 (depicted in FIG. 2), routers 72 (depicted in FIG. 2), devices, or nodes coupled to the communication adaptor 18 at the communication adaptor connector 22. The communication adaptor 18 may be a network interface that transfers information from a node such as a router 72, a terminal device 74 or 75 (depicted in FIG. 2), a general purpose computer 76 (depicted in FIG. 2), a user interface 77 (depicted in FIG. 2) or another gateway 11 to the gateway 10 or from the gateway 10 to a node 11, 72, 74, or 76. The communication adaptor 18 may be an Ethernet adaptor or another adaptor for another type of network communication. It will be recognized that the gateway 10 may alternately or in addition be coupled directly to one or more other devices through one or more input/output adaptors (not shown).

The input device 24 and output device 26 may couple the gateway 10 to one or more input or output devices such as, for example, one or more pushbuttons and diagnostic lights or displays. It will be recognized, however, that the gateway 10 does not necessarily need to have an input device 24 or an output device 26 to operate.

The processor 12 may include or be attached to the real-time clock 38 such that the processor 12 may read or retrieve scheduled events from the data storage device 36 when or subsequent to real-time clock 38 indication that the scheduled time has arrived. Those retrieved scheduled events may then be transmitted across the network 40 or 42. One or more of such scheduled events may trigger messages to be sent at a time or in a cycle and, where more than one message is triggered to be sent across the network 40 or 42, those messages may form a queue. The queue may be created at the microprocessor 16.

FIG. 2 illustrates a network 70 in an embodiment of the present invention. In embodiments, the network 70 may be a mesh network. The network 70 includes a gateway, such as the gateway 10 illustrated in FIG. 1, one or any desired number of additional gateways 11, one or more routers 72, a plurality of end devices 74 and 75, and one or more general purpose computers 76 and user interfaces 77. The additional gateways 11 may be like the gateway 10 illustrated in FIG. 1, or may be of various configurations. The end devices may be actuated devices 74 such as lighting fixtures, blinds, or various other devices that are controlled by or in the network 70 and sensors 75 such as manually operated switches, light level sensors, and other ambient condition sensors.

Messages to be transmitted across the network 40, 42, or 70 may enter one or more queues, such as a broadcast queue for messages to be transmitted to all devices on the network, a multicast queue for messages to be transmitted to more than one but not all devices on the network, and a unicast queue for messages to be transmitted to one device on the network. Each queue may be a packet queue where packets making up a message are queued for transmission across the network 40, 42, or 70. Messages or packets may be placed in that queue by the processor 12. Those messages and packets to be transmitted across the network may furthermore come from different places or processor 12 functions including scheduled events read from the data storage device 36 by the processor 12 and events or data created by the processor from, for example, sensed data received from a sensor 75 coupled to the network 40, 42, or 70.

The messages transmitted across the network 40, 42, or 70 may include data to be used by one or more of the receiving nodes 72, 74, or 75 or events to be actuated at one or more of the end device receiving nodes 72, 74, or 75 such as turning a light on or off, energizing a motor on a motorized window shade or blind, controlling lighting brightness, or controlling lighting color.

In embodiments of wireless control networks, such as illustrated in FIG. 2, there are four types of components: the cloud 100, one or more user interfaces 76 and 77, one or more gateways 10 and 11, and control nodes 74 and 75.

The cloud 100 may be viewed as a set of software programs running on server computing on a cloud provider (such as Amazon Web Services or Google Cloud Platform) with elastic resources (meaning resources can adjust as needed), giving the appearance of an unlimited computing resource and an unlimited storage resource. One use of the cloud 100 may be to store messages like a database.

A user interface 76 or 77 may operate through a mobile software application (an "App") that may operate, for example, on the Android operating system or the Apple iOS operating system. The App is focused on an easy-to-understand and easy-to-use interface for the end customer of the product. This device is constrained by the Platform that it runs on and is heavily dependent on the operating system on which it runs.

The gateway 10, an embodiment of which is provided in and in connection with FIG. 1, manages communication between control nodes 74 and 75, a user interface 76 or 77, and the cloud 100. This gateway 10 may track the configuration of the control system. The gateway 10 may also communicate in multiple protocols, such as Internet Protocol (IP) and ZigBee Protocol. The gateway 10 may be an embedded device and, since there may be many gateways 10 and 11 in a control system 70, with one or more gateways 10 and 11 in a control network 70, they may be considered a cost sensitive device and, for that reason, run on small microprocessors with constrained resources.

Control nodes 74 and 75 include actuating nodes 74 that control fixtures, devices or equipment, for example, through output signals and sensing nodes 75 that receive a signal from a sensor, such as an ambient light sensor, a motion sensor, a temperature sensor, a pressure sensor, a flow sensor, or another type of sensor. Control nodes may wirelessly communicate with the gateway 10 using the ZigBee protocol. Control nodes 74 and 75 may be the most prevalent devices in the control system 70 and, thus, the most cost sensitive devices in the system 70. Accordingly, control nodes 74 and 75 may have highly constrained resources and may only communicate using the ZigBee protocol and so may communicate directly only with the gateway 10.

FIG. 3 illustrates an embodiment of a network 200 that illustrates communication paths 202, 204, 206, and 208 between the cloud 100, user interfaces 76 and 77, gateways 10 and 11, and control devices 74 and 75. Communication paths include a gateway to cloud communication path 202 for communication between the gateway 10 and a remote data storage device 210, which may also be referred to herein as the cloud, a gateway to user interface communication path 204 for communication between the gateway 10 and a user interface 77, which may be, for example, a mobile device, a mobile phone, a tablet, a laptop or other form of computer 76, and a gateway to thing communication path 206 for communication between the gateway 10 and nodes 74 and 75 that sense or that control end devices. There may also be a communication path 208 between the user interface 77 and the cloud 202.

In gateway 10 to cloud 100 and cloud 100 to gateway 10 communications, communication is typically conducted by way of the http(s) communication protocol. Communication between the gateway 10 and cloud 100 is always initiated by the gateway 10 such that the gateway 10 may communicate to the cloud 100 as desired and the cloud only communicates to the gateway 10 when polled by the gateway 10. A firewall typically stands as a gatekeeper for the gateway 10 and that firewall typically prevents any inbound communication to the gateway 10 that is not in response to a request for communication sent by the gateway 10. Thus, the gateway 10 can transmit messages to the cloud 100 and the gateway 10 can request information from the cloud 100, but the cloud 100 cannot initiate communication with the gateway 10. The cloud 100 may, therefore, store messages to be transmitted to the gateway 10 until the gateway 10 polls the cloud, requesting that those messages be transmitted from the cloud 100 to the gateway 10.

The cloud 100 may similarly hold or store messages for a user interface 76 or 77. The cloud may, however, never be the source of data transmitted to the gateway 10 or user interface 76, 77. Rather, the cloud acts as an intermediary to pass information from the user interface to the gateway and from the gateway to the user interface. The cloud may perform its intermediary function in various ways including acting as a database or a network relay that stores messages transmitted from one control system 70 device or node (i.e., 10, 11, 74, 75, 76, or 77) to another control system 70 device or node until the receiving device or node requests that one or more messages from a different node be provided to it. Thus, the cloud 100 is used as a conduit for communications between nodes. Acting as a conduit, the cloud 100 eliminates the need for a dedicated communication path between the gateway 10 and user interface 76 or 77.

To operate in such a system wherein each gateway 10, 11 acts as the source of information related to its associated control network, each gateway 10 and 11 periodically polls the cloud 100 to see if any request for information messages are waiting for that gateway 10 or 11. When the gateway 10 or 11 receives a request for information from, for example, one of the user interfaces 76 or 77, through the gateway 10 or 11 polling of the cloud 100, the gateway 10 or 11 can respond to that request by providing the requested information to the cloud 100. Requested information may be transmitted to the user interface 76 or 77 by a transmission initiated by the cloud 100 in response to the user interface 776 or 77 request for information.

When the gateway 10 or 11 receives a message from a user interface 76 or 77 through the cloud 100, the gateway 10 or 11 may increase the frequency of its polling of the cloud 100 in recognition that a user interface 76 or 77 that makes a request of that gateway 10 or 11 is likely to make additional requests for information from that gateway 10 or 11 during a session of user interface 76 or 77 activity.

In many control systems, both the Gateway 10 and the Cloud 100 keep track of parts of a local network of things (sensors and actuated devices). That leads to frequent updating, putting great demand on the network, and coherency problems where, for example, the cloud 100 does not receive an update and so holds and provides incorrect information. In the present invention, however, the gateway 10 retains all information related to the network 70. The gateways 10 and 11 are furthermore the source of all information about the network 70 that may be retrieved from the network 70. That includes information related to sensed values and states, commanded states and positions, schedules, configuration, and automated behavior of the local network managed by any gateway 10 or 11. Thus, in a situation wherein a user interface 76 or 77 is programmed or commanded to retrieve information about a network 70, that user interface 76 or 77 may communicate on the local network 70 or may communicate through the cloud 100 to the gateway 10 or 11 managing the information to be retrieved using the cloud 100 as a transmission mechanism, but the user interface 76 or 77 will not gather the desired information from a cache of previously acquired information in the cloud 100.

FIG. 4 illustrates a method 300 of operation for a control network, such as the control network illustrated in FIG. 2. The gateways 10 and 11 in that network 70 may be viewed as the backbone of that network 70 because those gateways 10 and 11 communicate (directly or through one or more network nodes, such as routers 72) with the sensing and actuating control nodes 74 and 75 in the network 70 or a portion of the network 70 that operates in connection with that gateway 10 or 11, acquire and retain status of devices on the network 70 and information related to the network 70, communicate with user interfaces 76 and 77 that request information from the network 70 or provide changes in configuration of the network 70, and communicate with the cloud 100. More than one gateway 10 and 11 may be operating in a sub-network for backup purposes or to divide and increase the speed communications in that sub-network, for example.

At 302, the gateway 10 establishes communication with one or more control nodes 74 and 75 in its network 70. Establishing communication with control nodes 74 and 75 may be a complex activity driven by proximity of the control nodes, logical groupings of control nodes 74 and 75, or input received from a user interface, for example. When the gateway 10 establishes communication with the control nodes 74 and 75, the gateway 10 may communicate groupings of interoperating control nodes 74 and 75 or communication pathways for the control nodes 74 and 75 and the gateway 10, for example. The network 120 illustrated in FIG. 2 may include one or a plurality of sub-networks, wherein each sub-network includes one or more of devices or nodes 10, 11, 74, 75, 76, or 77.

At 304, the gateway 10 retrieves current values associated with control nodes 74 and 75 and associates those values with units of measurement, such as lumens or degrees, or a state, such as on or off. For example, the gateway 10 may retrieve a value associated with a medium sensed by a sensor coupled to a sensing control node 75. The gateway 10 may alternatively or additionally retrieve a binary state associated with the operational status of a piece of equipment or a natural phenomenon, such as day and night.

The gateway 10 may also retrieve one or more values associated with an actuating control node 74. For example, the gateway 10 may retrieve a commanded state or position of an actuated device, fixture, or piece of equipment controlled by an actuating node 74. The commanded state or position may, for example, be a position in which an actuating control node 74 has positioned its control device or a state that a piece of equipment has been commanded to by the actuating node 74.

At 306, the gateway 10 transmits current schedule and other configuration information to control nodes 74 and 75. For example, the gateway 10 may provide information to control nodes 74 and 75 including, but not limited to, updated rules for operation, schedules by which controlled devices and equipment are to follow, groupings of interoperating control nodes 74 and 75, communication pathways for the control nodes 74 and 75 and the gateway 10, and user communications to the control nodes 74 and 75.

At 308, a user interface 76 or 77 communicates with the gateway 10 directly on the network 70 or through the cloud 100. The user interface 76 or 77 may acquire information sensed by sensors and commanded status of devices coupled to sensing control nodes 75 through the gateway 10. The user interface may also or alternatively retrieve information about positions and states to which things have been commanded through the gateway 10. The user interface 76 or 77 may also provide a wide variety of information to the gateway 10 about operation of the control nodes 74 and 75, for example, modifying control node 74 and 75, groupings, and schedules and the gateway 10 may communicate that information to the control modes 74 and 75.

At 310, the gateway 10 polls the cloud to see if there has been a request made through the cloud 100 for information held by the gateway 10. If any information held by the gateway 10 has been requested through the cloud 100, the gateway 10 will provide that information to the cloud to be passed to another network 70 device (i.e., 11, 76, 77). Such requests for information through the cloud 100 may be secured or otherwise confirmed to assure that the requesting device is an appropriate device to which to provide that information.

At 312, the gateway 10 provides information requested through the cloud 100 to the cloud 100. For example, the user interface 76 or 77 may request information from the network 70 coupled to the gateway 10. That request may be made directly to the gateway 10 through the local area network 70 on which the gateway 10 is communicating or indirectly to the gateway 10 through the cloud 100 using a wide area network over paths 202 and 208 as illustrated in FIG. 3. If the user interface 76 or 77 request for information is made through the cloud 100 over the wide area network on path 208, the requested information may be transmitted from the gateway 10 through the wide area network on path 202 and held or otherwise stored in the cloud 100. For example, the requests made by the user interface 76 or 77 may be held in the cloud 100 in random access memory or a data storage device until the gateway 10 polls the cloud to retrieve messages held for the gateway 10 in the cloud. Similarly, information transmitted from the gateway 10 through the wide area network on path 202 for the user interface 76 or 77 may be held in the cloud 100 in random access memory or a data storage device. The gateway 10 may periodically poll the cloud 100 and in the next polling after the information request was transmitted to the cloud 100, the gateway 10 may receive the requests received in the cloud 100 from the user interface 76 or 77. The gateway 10 may then transmit one or more responses to the requests for information to the cloud 100. The cloud 100 may then relay or transmit those responses to the user interface 76 or 77. Such transmission to the user interface 76 or 77 may be initiated by the cloud 100 or may be initiated by the user interface 76 or 77 when, for example, the user interface polls or otherwise contacts the cloud 100 to receive requested information.

The user interface 76 or 77 may alternatively or additionally provide information to devices 10, 11, 74, 75 on the network 70 through the gateway 10. The user interface 76 or 77 may provide that information directly to the gateway 10 through a local area network 70 on which the gateway 10 is communicating or indirectly to the gateway 10 through the cloud 100 using a wide area network over paths 202 and 208 as illustrated in FIG. 3. If the user interface 76 or 77 provides information through the cloud 100 over the wide area network on path 208, that information will be retained in the cloud 100 until the gateway 10 polls the cloud 100 on path 202 to determine whether the cloud 100 is holding information targeted to the gateway 10. The gateway 10 then initiates transmission to the gateway 10 of the information requested by the user interface 76 or 77 and held in the cloud 100 that is intended for the gateway 10.

Various information may be transmitted to the gateway 10 from the user interface 76 or 77 through the cloud 100 including scheduling changes for the control nodes 74 and 75, operational rule changes, system set-up changes, overrides to command an actuating control node 74 to place its controlled device or equipment in a desired state or position, or calibration information for a sensing control node 75.

In an embodiment of communicating control network information to a user interface, the wireless gateway 10 receives control system information from a control node 74 or 75 wirelessly over the local area mesh network 70. The wireless gateway 10 then receives a request for control system information from the user interface 76 or 77. That requested information may be information the gateway 10 received from the control nodes 74 or 75 or information retained by the wireless gateway 10. The wireless gateway 10 receives that request from the remote server 100 when the gateway 100 polls the remote server 100 over the wide area network communication path 202, as illustrated in FIG. 3. The wireless gateway 10 then provides the requested control system information to the remote server 100 for delivery to the user interface 76 or 77.

In that embodiment, the user interface 76 or 77 never retrieves any information from the remote server 100 that was not left at the remote server by the gateway 10 for the user interface 76 or 77. The user interface 76 or 77 may also never receive information from the remote server 100 that was not provided to the remote server 100 by the gateway 10 in response to a user interface 76 or 77 request.

Thus, the remote server 100 may never provide any request for control system information to the gateway 10 unless the gateway 10 polls the remote server 100 for control system information. Furthermore, the remote server 100 may never provide any modification to the control nodes 74 or 75 received from a user interface 76 or 77 to the gateway unless the gateway 10 polls the remote server 100 requesting that modification.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalent.

What is claimed is:

1. A control network, comprising:
   a gateway communicating on a local area network and a wide area network;
   a sensing control node and an actuating control node communicating control information to the gateway on the local area network;
   a cloud server communicating with the gateway by way of the wide area network; and
   a user interface communicating a request for sensed information from the sensing control node and a request for state information from the actuating control node through the gateway by way of the wide area network, the user interface communicating the request for sensed information from the sensing control node and the request for state information from the actuating control node through the gateway by sending a plurality of messages to the cloud server that are retrieved from the cloud server by the gateway through gateway polling of the cloud server, the user interface only receiving sensed information and state information from the cloud server that was left for the user interface on the cloud server by the gateway in response to a user interface request for information.

2. The control network of claim 1, wherein the gateway transmits information for the user interface to the cloud server.

3. The control network of claim 2, wherein the user interface receives only information transmitted to the cloud by the gateway, and the user interface receives that information from the cloud server by polling the cloud server.

4. The control network of claim 1, wherein the cloud only transmits information to the gateway when the cloud server is polled by the gateway.

5. The control network of claim 1, wherein the user interface only receives information from the gateway and wherein the cloud server acts as an intermediary to pass information from the user interface to the gateway and from the gateway to the user interface.

6. The control network of claim 1, further comprising the user interface receiving information from the cloud server that was placed on the cloud by the gateway in response to a user interface request.

7. The control network of claim 1, further comprising the user interface receiving information from the cloud server that was placed on the cloud server by the gateway in response to a user interface request only when the user interface polls the cloud server.

8. The control network of claim 1, the gateway further comprising:
   a network communication device for communicating with a remote device; and
   a processor coupled to the network communication device, the processor including instructions which, when executed by the processor, cause the processor to:
      communicate with the sensing control node and the actuating control node;
      communicate with the cloud server; and
      communicate with the user interface, providing all information regarding the sensing control node and the actuating control node requested by the user interface through the cloud server and communicating all commands related to the network transmitted by the user interface through the cloud server.

9. The control network of claim 8, the processor including instructions that further cause the processor to initiate all communications with the cloud server and the user interface.

10. A method of communicating control network information to a user interface, comprising:
   a wireless gateway receiving control system information from at least one of an actuating control node and a sensing control node wirelessly over a local area mesh network;
   the wireless gateway receiving a request for control system information when it polls a remote server over a wide area network, the request transmitted to the remote server from a user interface; and
   the wireless gateway providing the requested control system information to the remote server for delivery to the user interface;
   the user interface never retrieving any information from the remote server that was not left at the remote server by the gateway in response to a user interface request.

11. The method of communicating control network information to a user interface of claim 10, wherein the user interface never receives information from the remote server that was not provided to the remote server by the gateway in response to a user interface request.

12. The method of communicating control network information to a user interface of claim 10, further comprising the wireless gateway transmitting control system information to a control node wirelessly over the local area mesh network.

13. The method of communicating control network information to a user interface of claim 10, wherein the user interface only receives information from the gateway and wherein the remote server acts as an intermediary to pass information from the user interface to the gateway and from the gateway to the user interface.

14. The method of communicating control network information to a user interface of claim 10, wherein the remote server does not provide any request for control system information to the gateway unless the gateway polls the remote server for control system information.

15. The method of communicating control network information to a user interface of claim 10, wherein the remote server does not provide any modification to the sensing control node received from a user interface to the gateway and does not provide any modification to the actuating control node received from a user interface to the gateway unless the gateway polls the remote server requesting that modification.

16. The method of communicating control network information to a user interface of claim 10, further comprising the gateway polling the control node to acquire control system information.

17. A gateway single source of information system, comprising:
   a local area network comprising:
      an actuating node;
      a powered device connected to and actuated by the actuating device; and
      a gateway wirelessly coupled to the actuating node on the local area network, the gateway storing data regarding the operation of the actuating device;
   a remote server that is remote from the local area network and coupled to the gateway through a wide area network, the remote server having a database storing a periodically backed up copy of the data stored on the gateway; and
   a user interface device for communicating with the gateway;
   wherein the gateway comprises a processor and a computer readable storage medium including code executable by the processor to:
      receive and store from the actuating device an update to the data regarding a change in operation of the powered device connected to the actuating device;
      receive and store from the user interface device another update to the data regarding another change in operation of the powered device; and
      receive a prompt for information regarding the powered device from the user interface device such that:
         when the user interface device is communicating on the local area network, wirelessly transmit from the gateway to the user interface via the local area network a subset of the current data stored on the gateway regarding current operation of the powered device; and
         when the user interface device is not communicating on the local area network, transmit, from only the gateway to the user interface via the remote server, a subset of the current data stored on the gateway regarding current operation of the powered device.

18. The gateway single source of information system of claim 17, wherein none of the subset of the current data transmitted to the user interface device is from the periodically backed up copy of the data stored on the database on the remote network.

19. The gateway single source of information system of claim 17, wherein the user interface device only receives information from the gateway and wherein the cloud acts as an intermediary to pass information from the user interface to the gateway and from the gateway to the user interface.

20. The gateway single source of information system of claim 17, wherein the gateway code further causes the processor to initiate all communications with the cloud and the user interface.

* * * * *